(12) United States Patent
Tepus (10) Patent No.: US 9,003,234 B2
(45) Date of Patent: Apr. 7, 2015

(54) MACHINE AND METHODS FOR REASSIGN POSITIONS OF A SOFTWARE PROGRAM BASED ON A FAIL/PASS PERFORMANCE

(71) Applicant: Infineon Technologies AG, Neubiberg (DE)

(72) Inventor: Cristian Tepus, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 141 days.

(21) Appl. No.: 13/791,634

(22) Filed: Mar. 8, 2013

(65) Prior Publication Data

US 2014/0258784 A1  Sep. 11, 2014

(51) Int. Cl.
*G06F 11/00* (2006.01)
*G06F 11/36* (2006.01)

(52) U.S. Cl.
CPC .................................. *G06F 11/3688* (2013.01)

(58) Field of Classification Search
USPC ......................................................... 714/38.1
See application file for complete search history.

(56) References Cited

U.S. PATENT DOCUMENTS

| | | | | |
|---|---|---|---|---|
| 5,761,510 A * | 6/1998 | Smith et al. | | 717/124 |
| 8,495,576 B2 * | 7/2013 | Ndem et al. | | 717/124 |
| 8,788,875 B2 * | 7/2014 | Gerhart | | 714/4.4 |
| 2003/0005171 A1 * | 1/2003 | Schaeffer | | 709/315 |
| 2006/0048011 A1 * | 3/2006 | Dieffenderfer et al. | | 714/38 |
| 2007/0220342 A1 * | 9/2007 | Vieira et al. | | 714/33 |
| 2011/0258602 A1 * | 10/2011 | Ndem et al. | | 717/124 |
| 2013/0231895 A1 * | 9/2013 | Zhu | | 702/183 |
| 2014/0237295 A1 * | 8/2014 | Bokhari et al. | | 714/38.1 |
| 2014/0245068 A1 * | 8/2014 | Agarwal et al. | | 714/38.1 |
| 2014/0245069 A1 * | 8/2014 | Hu et al. | | 714/38.1 |
| 2014/0250336 A1 * | 9/2014 | Tepus | | 714/38.1 |
| 2014/0258783 A1 * | 9/2014 | Fenster | | 714/38.1 |
| 2014/0281730 A1 * | 9/2014 | Chazan et al. | | 714/38.1 |
| 2014/0281731 A1 * | 9/2014 | Bogsanyi et al. | | 714/38.1 |
| 2014/0281732 A1 * | 9/2014 | Elias et al. | | 714/38.1 |
| 2014/0281733 A1 * | 9/2014 | Singonahalli et al. | | 714/38.1 |

* cited by examiner

*Primary Examiner* — Kamini Patel (74) *Attorney, Agent, or Firm* — Slater & Matsil, L.L.P.

(57) ABSTRACT

A machine and methods for reassign the execution order of program steps of a multi-step test program is disclosed. In an embodiment a machine for evaluating an error in a software program includes a microprocessor coupled to a memory, wherein the microprocessor is programmed to evaluate the error by (a) providing program steps of the software program, (b) assigning a position number to each program step, (c) performing an evaluation run on the program steps, (d) evaluating a performance of each program step, (e) rearranging the position number of each program step based on the performance of each program step, and (f) repeating steps (c)-(e).

20 Claims, 7 Drawing Sheets

MACHINE AND METHODS FOR REASSIGN POSITIONS OF A SOFTWARE PROGRAM BASED ON A FAIL/PASS PERFORMANCE

TECHNICAL FIELD

The present invention relates to software program error analysis in general, and test program error analysis in particular.

BACKGROUND

Test programs are routinely used to evaluate prototypes of products or products manufactured in high volume with respect to specifications defined by product developers or customers. Newly developed or modified test programs may occasionally fail during initial periods of trial, often for unknown reasons. The search for the root cause(s) of one or more errors in a test program may turn out to be complex and time-consuming. It is important that failing tests are identified as early as possible to be able to quickly address the root causes of failure.

SUMMARY OF THE INVENTION

In accordance with an embodiment of the invention a machine for evaluating an error in a software program comprises a microprocessor coupled to a memory, wherein the microprocessor is programmed to evaluate the error by (a) providing program steps of the software program, (b) assigning a position number to each program step, (c) performing an evaluation run on the program steps, (d) evaluating a performance of each program step, (e) rearranging the position number of each program step based on the performance of each program step; and (f) repeating steps (c)-(e).

In accordance with an embodiment of the invention a non-transitory computer-readable storage medium with an executable program stored thereon, wherein the program instructs a microprocessor to perform the following steps (a) providing program steps of the software program, (b) assigning a position number to each program step, (c) performing an evaluation run on the program steps, (d) evaluating a performance of each program step, (e) rearranging the position number of each program step based on the performance of each program step and (f) repeating steps (c)-(e).

In accordance with an embodiment of the invention a machine for evaluating an error in a software program comprising a microprocessor coupled to a memory, wherein the microprocessor is programmed to evaluate the error by (a) classifying the program steps of the software program, (b) assigning a position number to each program step, (c) setting a value for a fail/pass count to a starting count for each program step, (d) performing an evaluation run on the program steps, (e) evaluating a performance of each program step, and (f) rearranging the position number of each program step based on the performance of each program step.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Software programs (also referred herein as multi-step programs) may fail during operation due to software programming errors or hardware failures. The search for the root cause(s) of the failures of software programs comprising multiple steps may be a complex and time-consuming task. Usually, when re-running a version of the software program comprising already one or more "bug fixes", the person evaluating the problem determines manually the execution order of the program steps. With this kind of approach it may sometimes take a long time to eliminate the error source(s). In a worst case scenario, some bug fixes might not even be validated if time allocated to the problem expires. There is a need to balance the priorities of the individual program steps and the time allocated to the problem, in order to concentrate as soon as possible on high risk sections of the erroneous software program.

Embodiments of the algorithms may be applied to generic software programs or to test programs, e.g., programs testing generic software programs. For example, the software program may be a program for designing chips in the semiconductor industry and the test programs may be programs testing these design programs.

Embodiments of the present invention comprise a reassigning algorithm for automatically reordering program steps of a software program (or a portion of a software program) for a next or up-coming evaluation run based on a fail/pass status of a prior or last evaluation run.

Embodiments of the invention comprise a non-transitory computer-readable storage medium with an executable program stored thereon, wherein the program instructs a microprocessor to perform a reassignment algorithm or rearranges the execution order of program steps. Embodiments of the invention comprise a machine for performing a reassignment algorithm or for rearranging the execution order of program steps.

Figure 1:
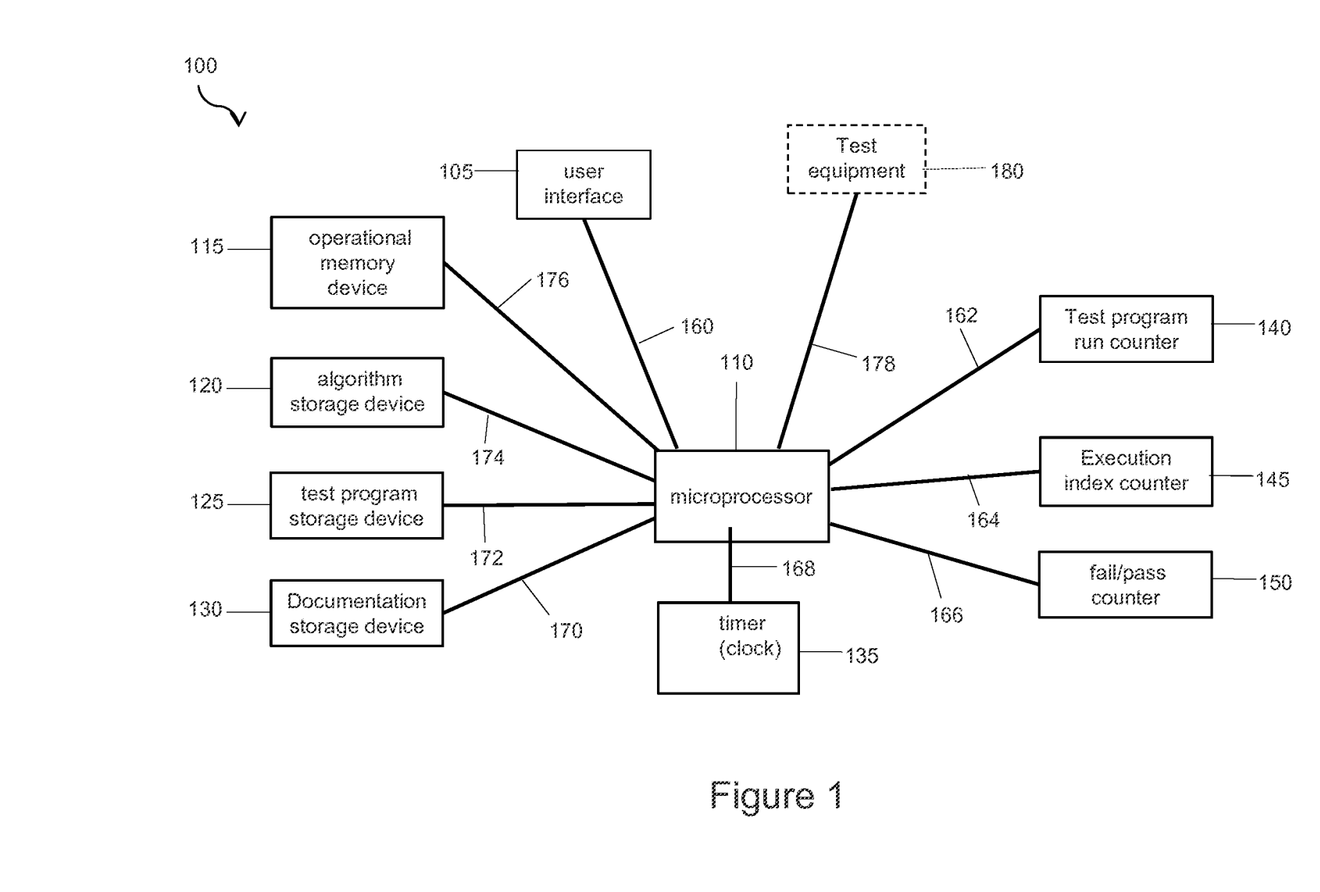
FIG. 1 illustrates a block diagram of an embodiment of a machine enabling an automated reassignment of program step positions in an execution order for a new evaluation run.

Embodiments of the invention provide a reassignment of positions in an execution order of a next evaluation run performed by a machine 100 shown schematically in FIG. 1. The machine 100 comprises a user interface 105, a microprocessor 110, and various memory devices employed for temporary data storage during the algorithm operation (operational memory device 115), for algorithm storage device 120, test program storage device 125, and documentation storage device 130. The machine 100 comprises moreover a timing device (clock) 135, a test program run counter 140, an execution index counter 145, and a fail/pass counter 150.

Furthermore the machine 100 comprises various electrical connections (some of them depicted exemplarily, such as 160, 162, 164, 166, 168, 170, 172, 174, 176) establishing electrical connectivity between the above mentioned sub-systems of the machine 100. In addition, the machine 100 comprises an electrical interconnection 178 to test equipment 180 (the latter being not part of the invention) from which test results may be sent off during or after testing. Alternatively test data transfer may occur using a transportable storage medium such as a CVD or a memory stick.

The user interface 105 may be utilized to give specific operation instructions and to review the output responses provided by the disclosed algorithm. The algorithm storage device 120 comprises a non-transitory computer-readable storage medium with one or more executable programs stored thereon. Any of these stored programs may instruct the microprocessor 110 to perform instructions for the rearrangement of the positions of individual test program steps in test program evaluation runs. The test program storage device 125 comprises memory to store test programs to be evaluated or already tested test programs. The documentation storage device 130 comprises memory to store results of test program runs.

The test program run counter 140 counts the number of executed test program runs, the latter comprising an original test program run and subsequent regression runs carried out if a failing test program undergoes one or more modifications prior successful program repair. The execution index counter 145 counts the number of program steps executed during a particular test program run. (This number may vary slightly from test program run to test program run. Program step modifications introduced between consecutive test program runs may change the required run time for altered tests, thereby changing the number of program steps which can be executed before a defined test time limit is exceeded.) The fail/pass counter 150 stores information how often a particular program step failed or passed during a series of test program runs.

Figure 2:
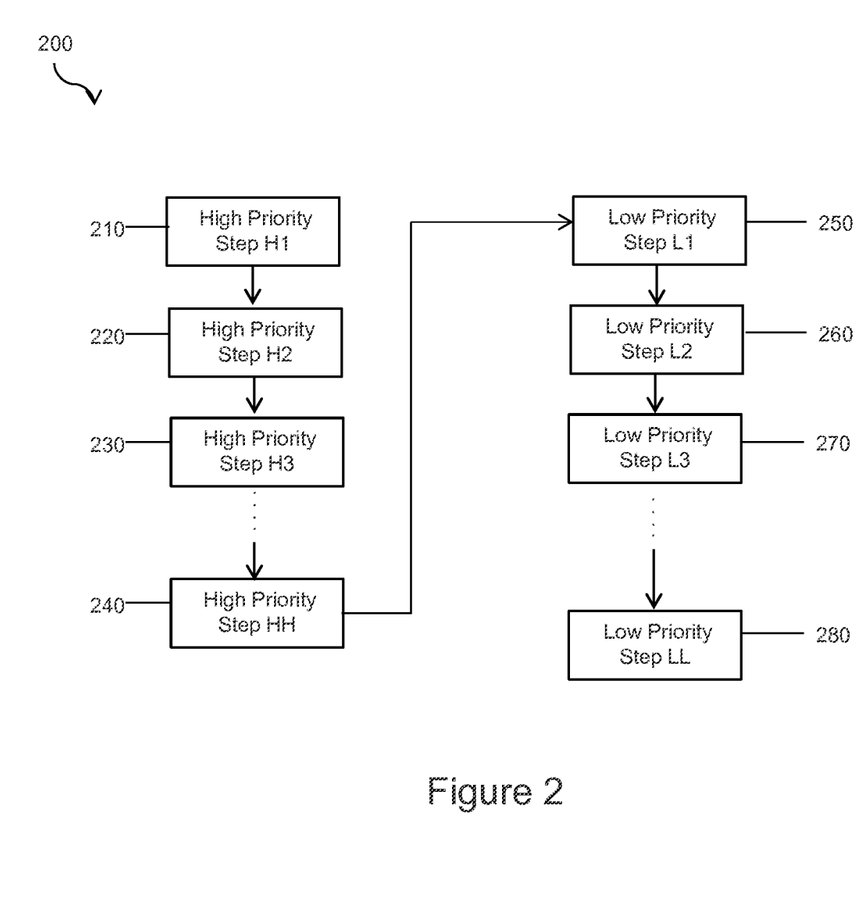
FIG. 2 illustrates a generic software program comprising high and low priority program steps.

FIG. 2 illustrates an embodiment of a software program comprising several program steps (e.g., program steps of a test program). The software program 200 comprises a number H of high priority steps, H1, H2, H3, . . . HH (210, 220, 230, 240, respectively), and a number L of low priority tests, L1, L2, L3, . . . LL (250, 260, 270, 280, respectively). In general, an execution order for a very first evaluation run of a particular software program may be determined manually based on priorities of interest or previous experiences, etc. For example, key functionalities or critical features of the program may be ranked highest in determining the first execution order.

Certain embodiments of the invention may comprise three consecutive phases of operation leading to instructions regarding the execution order of the software program in a next program run. A first phase comprises program set-up procedures. A second phase is dedicated to individual step performance and data accumulation over so far executed evaluation runs. A third phase comprises calculation of a modified execution order for a next evaluation run.

Figure 3:
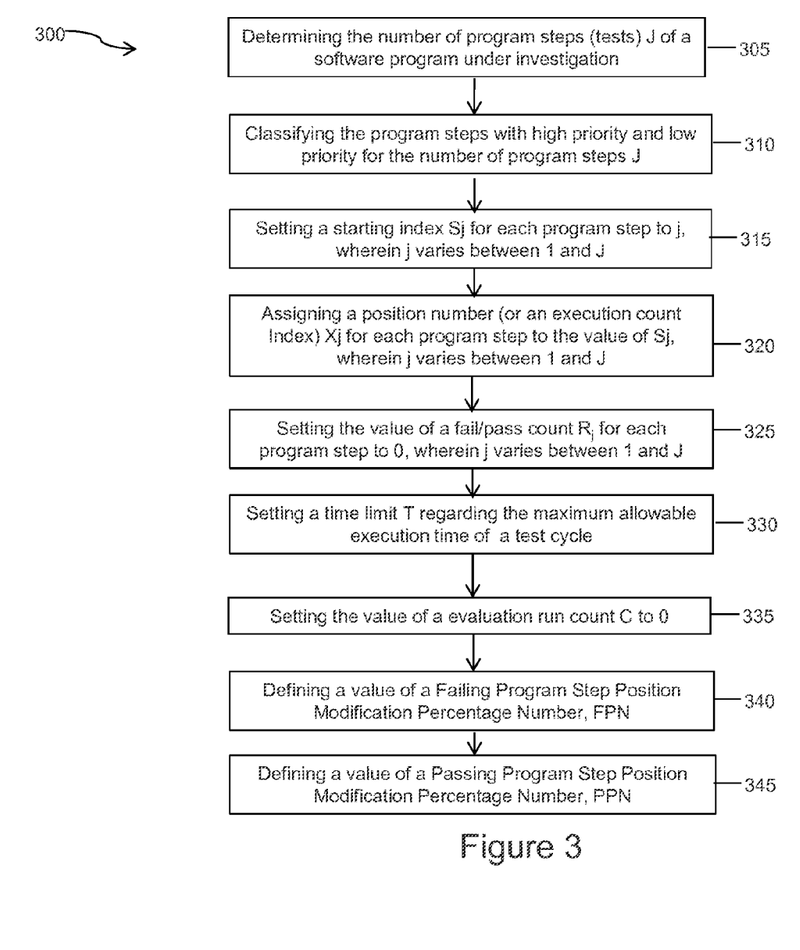
FIG. 3 illustrates a flowchart of a set-up procedure for a reassignment algorithm according to an embodiment of the invention.

FIG. 3 illustrates a flowchart 300 of a set up procedure according to an embodiment of the invention. Some of the listed actions comprise manual inputs other actions may be initiated automatically by the machine as part of the set-up for a first evaluation run.

In step 305 the number of program steps (e.g., tests for a test program) J of a software program to be evaluated is determined. For a software program (e.g., software program 200) that comprises a number of high priority steps H and a number of low priority steps L, the number of program steps (e.g., tests) J is the sum of H and L.

In step 310, each of the J program steps of the test program is classified into a group of high priority program steps or a group of low priority program steps. This may be done in practice by assigning a priority parameter $P_j$ (the index j varying between 1 and J) for each program step to either 1 if the program step is a high priority program step (e.g., high priority test) or to 0 if the program step is a low priority program step (or vice versa). Based on this classification, the error analysis program can automatically calculate the number of high priority steps H and the number of low priority steps L.

In step 315 a starting index $S_j$ is set to a value of j for a $j^{th}$ program step, wherein j may vary between 1 and J. The starting indices indicate the ranking positions of the J tests in the execution order prior to the start of the first evaluation run.

In step 320 an execution index $X_j$ is set to the $j^{th}$ program step for each j between 1 and J. The execution index $X_j$ assigns a position number corresponding to the program step's position in the execution order of the running software program. The values of the $X_j$s may change from evaluation run to evaluation run due to reassign the positional numbers of the individual program steps base on embodiments of algorithms described in detail below.

In step 325 a fail/pass count $R_j$ (its index j varying between 1 and J) is set to 0 for each program step. $R_j$s (explained below) are indicators of the fail/pass performance of the $j^{th}$ program steps during a series of test program runs.

In step 330 a time limit is set for the maximum allowable execution time of an evaluation run or cycle. For example, if the software program is a test program, these instructions may be transferred to the test equipment 180. Alternatively, a test time limit may be set directly on the test equipment 180.

In step 335 an evaluation run count C is set to 0. The value of the evaluation run count C indicates the number of evaluation runs which have already taken place or which are currently running (e.g., which are currently in progress).

In step 340 a value of a so-called Failing Program Step Position Modification Percentage Number, FPN, is defined. FPN indicates by how many percent the positional number of a program step failing in a last evaluation run may be decreased in an initial phase of position re-assignment.

Optionally, in step 345 a value of a Passing Program Step Position Modification Percentage Number, PPN, may be defined. PPN indicates by how many percent the positional number of a test passing in a last evaluation run may be increased in an initial phase of position reassignment. In one embodiment the PPN may be only applied in one of the later described reassignment algorithm.

With step 340 or step 345 the set-up procedure may be completed.

Figure 4:
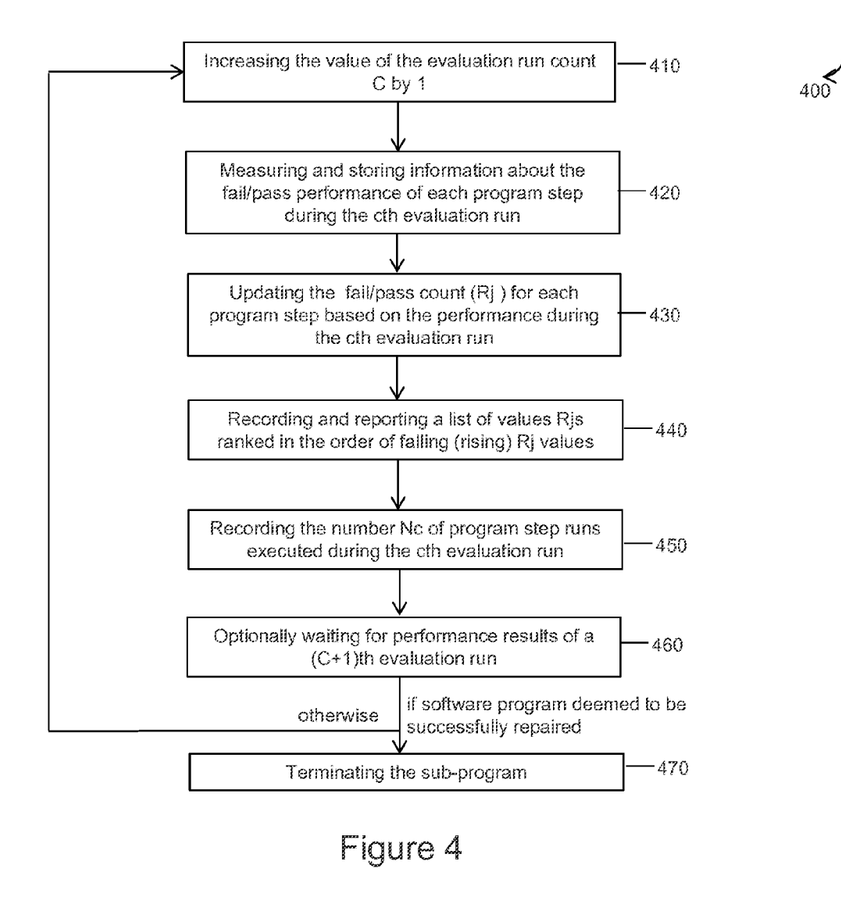
FIG. 4 illustrates a flowchart of a procedure for calculating of fail/pass count values as measures of fail/pass performances of program steps during a series of evaluation runs according to an embodiment of the invention.

FIG. 4 illustrates a flowchart 400 of an evaluation run (or execution of a sub-program) according to an embodiment of the invention. The evaluation run provides information of fail/pass performances of the program steps.

In step 410 the value of the evaluation run count C (which is set to 0 in step 335) is increased by 1. For example, prior to the start of the very first evaluation run, the evaluation run count C is raised from 0 to 1.

In step 420 the software program is run and the fail/pass performance of every individual program step is measured for the evaluation run. The fail/pass counter 150 stores or registers the fail/pass performance of every individual program step of the evaluation run for the $c^{th}$ test cycle. The fail/pass counter 150 stores the fail/pass performance of every individual program step for every evaluation run of the 1–c test cycles.

In step 430 the fail/pass count values ($R_j$) of each program step are updated after the evaluation run. Every time a particular program step of an evaluation run fails, the value $R_j$ for that individual program step is increased by 1. Every time the program step of the evaluation run is passed for that individual program step, the value $R_j$ is decreased by 1. In various embodiments if the values $R_j$s reach negative territories, the values $R_j$s are set to 0. In various embodiments the inputs needed for updating values $R_j$s is directly sent from the test equipment 180 to the machine 100 while a test program is running.

In step 440 a list of $R_j$s values is generated and/or reported and stored. In various embodiments, the $R_j$s are ranked in the order of falling values $R_j$s. Alternatively, the values $R_j$s are ranked in the order of raising values $R_j$s.

In step 450 the number of program step runs in a particular ($c^{th}$) test cycle, $N_c$, is recorded. The index c of an $N_c$ indicates the position of a particular evaluation run within a series of evaluation runs. $N_7$, for example, indicates the number of program steps run in a $7^{th}$ evaluation run.

In an optional waiting period (step 460), it is determined whether further evaluation runs should be carried out. Even if all program steps passed in a last evaluation run, one may still decide to do one or more additional evaluation runs to verify the reproducibility of the positive result. In case a further evaluation run is needed or desired, the algorithm loop is restarted with a return to step 410. Otherwise the evaluation runs are stopped in step 470.

Embodiments of algorithms are discussed which reassign the positions of program steps of a multi-step software program (e.g., change the execution order) for a next evaluation run based on the fail/pass performance of the program steps in a last evaluation run. Each of these algorithms resides as a cache mechanism over an existing automated framework. Embodiments of these algorithms provide a continuous up-date of the position of the particular program step. A program step receives a lower positional number as long as the particular program step fails, and, after repairing or debugging the program step increases its positional number with every successful subsequent program step run. The down-grading/up-grading of the positional number occurs incrementally. After performing error-free program step runs for a certain number of times, the program step may retain its original position in the execution order, as defined prior to the start of the first evaluation run.

There are various embodiments for regulating the up-grading or down-grading of the individual program steps. Three possible options are discussed in the following.

Figure 5:
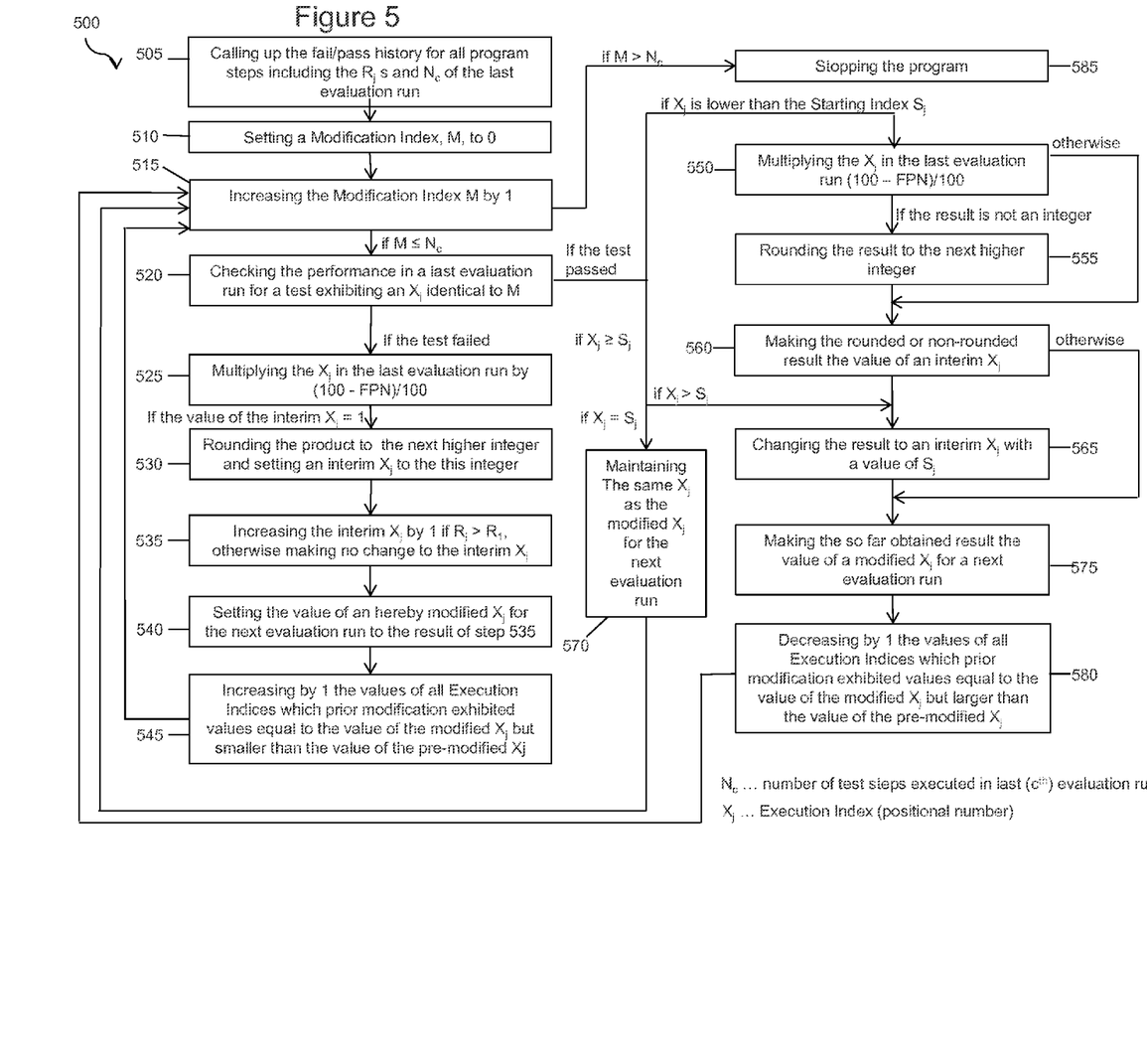
FIG. 5 illustrates a flowchart of a rearranging algorithm of an execution order for an evaluation run according to an embodiment of the invention.

FIG. 5 illustrates a flowchart 500 of an algorithm for reassigning the positional numbers of the program steps according to an embodiment of the invention.

In step 505 the fail/pass history for all program steps is received, including the current $R_j$s and the number of program steps, $N_c$, analyzed during the last ($c^{th}$) evaluation run. The performance ("fail" or "pass") of each individual program step in the last evaluation run may be the primary criterion deciding how the positional number, $X_j$, of each program step is modified for the next evaluation run. The performance over all so far executed evaluation runs (expressed in a corresponding $R_j$ value) may play a secondary role under certain conditions.

In step 510 a Modification Index, M, is set to 0. The Modification Index M counts the number of Execution Indices ($X_j$s) which have been or are currently modified during a particular $X_j$ position reassignment cycle. The modification of $R_j$s is carried out program step-by-program step in the order of rising $X_j$ values of the last evaluation run.

The next step 515 is the beginning of an algorithm loop. In step 515 M is increased by 1.

As long as M does not exceed $N_c$, the program moves on to step 520. In this step the performance in the last evaluation run for a program step exhibiting an $X_j$, the value of which is equal to M, is checked.

After step 520 the algorithm splits into two routes, one assigned to program steps which failed in the last evaluation run, the other one to program steps which passed in the last program run. If the checked program step failed in the last evaluation run, then step 525 follows. Therein the $X_j$ for the last evaluation run is multiplied by (100−FPN)/100, wherein FPN is the Failing Program Step Position Modification Percentage Number.

If the result of the multiplication is not an integer number, then the result of step 525 is rounded up to the next higher integer. This is done in step 530. The obtained result (with or without round-up) is called an "interim $X_j$".

In step 535, a special rule is applied if the value of the interim $X_j$ is 1, i.e. if the checked program step may potentially occupy the first position in the execution order of the next evaluation run. In this case, a comparison of $R_j$ values is used as a secondary ranking criterion. The value of the interim $X_j$ is raised by 1 if $R_j$ is larger than $R_1$ (the latter corresponding to a test occupying the first position in the last evaluation run). The rationale behind the criterion is that a program step which failed multiple times (thus exhibiting a high $R_j$) has most likely already found proper attention by a software expert trying to resolve the problem whereas a program step which failed rarely (possibly only once) may have yet received little (possibly too low) attention. Program steps that failed for the first time during the last program run (with an $R_j$=1) are favored by the rule applied in Step 535. Such tests may be considered rather risky because the root causes for their failures are still unknown.

In step 540 the result of step 535 modifies $X_j$ to be applied in the next evaluation run.

Whenever a program step moves up or down in the execution order from a last evaluation run to a next one, one or more other program steps may be affected in their ranking positions unless a position exchange involves two positions adjacent to each other in the execution order of the last evaluation run. Consistent ranking order may be achieved applying the following rule, exercised in step 545: Increase by 1 the values of all Execution Indices $X_j$ which exhibited values equal to the value of the modified $X_j$ but smaller than the value of the pre-modified $X_j$.

After step 545 the algorithm loop for failing program steps returns to step 515. M is raised by 1 and a next program step is processed.

If a test checked in step 520 had passed in the last evaluation run, then the algorithm follows different routes, splitting after step 520. If case $X_j$ is lower than the Starting Index $S_j$ of the program step concerned, then, in step 550, the $X_j$ held in the last evaluation run is multiplied by (100−FPN)/100, wherein FPN is the Failing Program Step Position Modification Percentage Number.

The selection of the value for FPN may be influenced by the nature of the software program under evaluation. If the number of program steps in the software program is very high, then it seems recommendable to opt for an aggressive change in execution positions from one evaluation run to the next run. In that case one may choose relatively high FPN values. FPN, expressed in integer percentage numbers, is limited to a range between 1 and 99. However, there exists a practical upper limit for FPN around 90% because such high FPN values produce too many priority conflicts with regard to the first position in the execution order. On the other hand, if PPN is lower than 10%, then changes in prioritization during an evaluation run series may occur too slowly.

If the result of step 550 is not an integer number, then the result is rounded up to the next higher integer number (in step 555). Otherwise, the algorithm moves directly on to step 560. In this step the rounded or non-rounded result becomes the value of an interim x, (analog to step 530).

The mathematics behind step 520 and step 550 ensure that a program step that failed all but the last evaluation run but passed in the last evaluation run is assigned to the position which the test held prior to its last failure or, in some cases, to a position directly below the position held prior to its last failure due to the impact of round-up procedures carried out in step 530 and/or step 560.

If, after passing step 560, the value of the interim $X_j$ is found to be larger than $S_j$, then, in step 565, the value of the interim $X_j$ may be changed to the value of the corresponding $S_j$. This rule may ensure that the position of a software step which passed in the last evaluation run may not fall too far below the position the program step held at the start of the evaluation runs ($X_j$ then being $S_j$.) Otherwise, the value of the interim $X_j$ is not altered and step 575 follows next.

In step 575 the so far obtained result either from step 560 or step 565 may be set as the value of a thereby modified $X_j$ for the next evaluation run.

When following the particular algorithm loop comprising step 575, again certain corrections may be made to obtain consistent positional numbers for all program steps. Such corrections are made in step 580, exercising the following rule: decrease by 1 the values of all Execution Indices which in the last evaluation run exhibited values equal to the value of the modified $X_j$ but larger than the value of the pre-modified $X_j$.

If a program step passed in the last evaluation run as checked in step 520 and its $X_j$ is equal to $S_j$, then in step 570 the value of $X_j$ is maintained and a hereby modified $X_j$ for the next evaluation run is set to $S_j$. Subsequently the algorithm moves directly to step 515 to determine a reassigned positional number for another program step.

If a program step passed in the last evaluation run as checked in step 520 and its $X_j$ is found to be larger than $S_j$, then step 565 is processed next, setting an interim $X_j$ to $S_j$ (again in consideration of the original starting order). Subsequently, in step 575, this interim $X_j$ is modified to the modified $X_j$ for the next evaluation run. For this particular case, consistence in all positional numbers may be again established in step 580. Afterwards, the algorithm returns to step 515 and M is increased by 1 once more.

Finally, once all program steps executed in the last evaluation run have been processed (e.g., M exceeds $N_c$), the position (re) assignment program is stopped in step 585.

Figure 6:
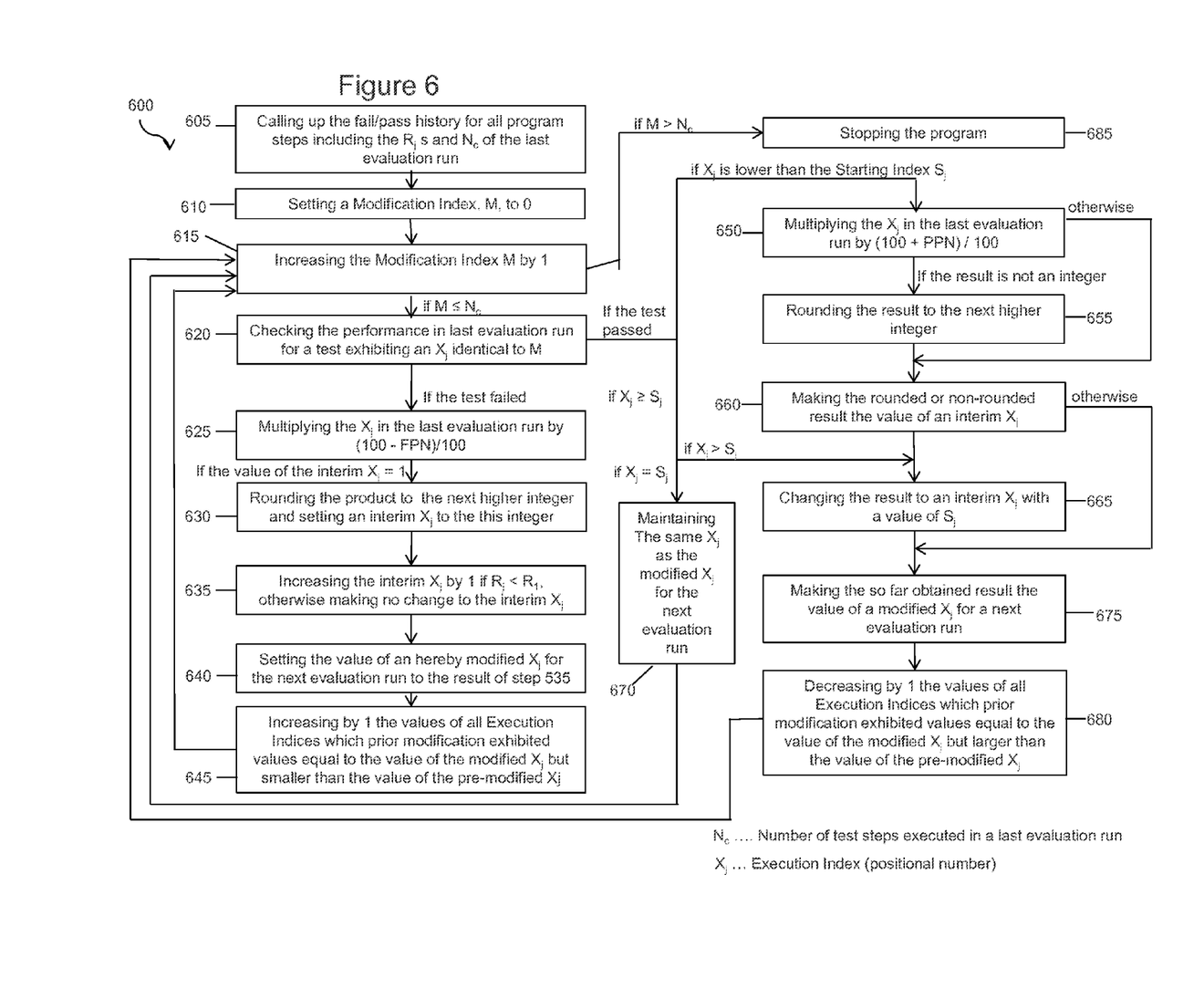
FIG. 6 illustrates a flowchart of a rearranging algorithm of an execution order for an evaluation run according to an embodiment of the invention.

FIG. 6 illustrates a flowchart 600 of a reassignment algorithm according to an embodiment of the invention. This algorithm works somewhat differently than the reassignment method of the embodiment of FIG. 5. Putting more emphasis on the risks of once or more often failing program steps, the increase of the positional number of a repaired program step in the course of subsequent successful evaluation run passages occurs more slowly as compared to the algorithm of the embodiment of FIG. 5. This may be achieved by utilizing the priority down-grading of passing tests a Passing Program Step Position Modification Percentage Number, PPN, which is smaller than the Failing Test Position Percentage Modification Number, FPN, employed for the priority up-grading of failing tests. PPN may be defined in an optional set-up step (step 345).

The process flow of the algorithm 600 is similar to the process flow of the algorithm 500. Steps with equivalent functionality carry the same last two digit numbers in step numbers appearing in FIG. 5 and FIG. 6 (and also in FIG. 7 discussed later). Step 650 is different as compared to step 550. In step 650, N of the last evaluation run is multiplied by (100+PPN)/100 whereas a multiplication by (100−FPN)/100 is carried out in step 550.

Figure 7:
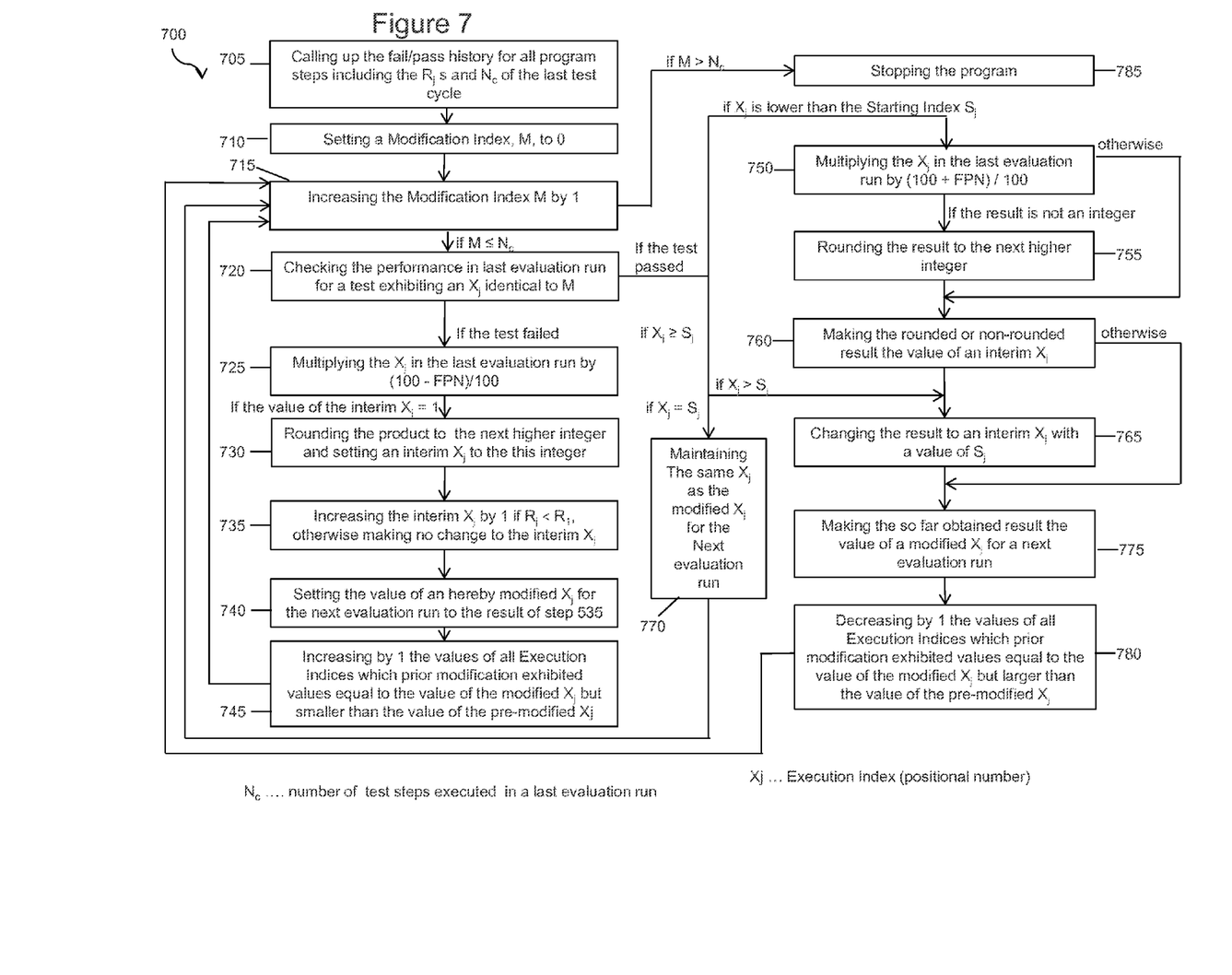
FIG. 7 illustrates a flowchart of a rearranging algorithm of an execution order for an evaluation run according to an embodiment of the invention.

FIG. 7 illustrates a flowchart 700 of a reassignment algorithm according to yet another embodiment of the invention. This algorithm 700 works similar as the algorithm 600 but may be less flexible. In both algorithms 600 and 700, the up-grading of the priorities of failing program steps occurs more aggressively than the down-grading of the priorities of passing program steps. With the algorithm 700, this difference is only moderately pronounced and the rules for up-grading and down-grading of priorities may be regulated by a single parameter only, namely the FPN. The algorithm 600, by comparison, has more flexibility because FPN and PPN can be set independently.

The flowchart 700 is similar to the flowcharts 500 and 600. In step 750 an N of the last evaluation run is multiplied by (100+FPN)/100 whereas in step 650 a multiplication by (100+PPN) is carried out.

In summary, embodiments of the present invention provide the following advantages: First, $R_j$ tables provide a quick insight regarding the overall performance of individual program steps during so far executed evaluation runs. Reliable program steps with low $R_j$s are easily distinguished from error-prone program steps with high $R_j$s. Second, recently failing program steps are moved up in priority in the execution order of regression runs and their priority is increased with every additional failure. In consequence, the likelihood that such critical program steps may not be executed within a maximum allowable software program time is reduced. Since critical and so far failing program steps are run earlier in the execution order of software program tests, an automatic registration of further program step failures by the test equipment may result in earlier attention to the observed problems. The effect of such earlier warnings accumulating over a larger number of software program evaluations may reduce the development time for a certain product, thereby saving time and costs.

In various embodiments the rule regulating the influence of $R_j$ values on the relative positions of program steps competing for the top ranking in the execution order may be modified, for example. Or different $X_j$ reassignment rules may be introduced for high priority tests and low priority tests. Focusing on failing program steps only with omission of rules for passing program steps is also a viable position reassignment strategy. It is therefore intended that the appended claims encompass any such modifications or embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A machine for evaluating an error in a software program comprising:
    a microprocessor coupled to a memory, wherein the microprocessor is programmed to evaluate the error by
    (a) providing program steps of the software program;
    (b) assigning a position number to each program step;
    (c) performing an evaluation run on the program steps;
    (d) evaluating a performance of each program step;
    (e) rearranging the position number of each program step based on the performance of each program step; and
    (f) repeating steps (c)-(e).

2. The machine according to claim 1, wherein rearranging the position number of each program step comprises
    if an individual program step fails the evaluation run, increasing the position number; and
    if the individual program step does not fail the evaluation run, maintaining the same position number or decreasing the position number.

3. The machine according to claim 1, wherein rearranging the position number of each program step comprises
    if an individual program step fails the evaluation run, reducing the position number; and
    if the individual program step does not fail the evaluation run, maintaining the same position number or increasing the position number.

4. The machine according to claim 1, wherein rearranging the position number of each program step comprises
    multiplying the position number of each program step with a failing position modification number when an individual program step failed; and
    multiplying the position number of each program step with a passing position modification number when the individual program step passed.

5. The machine according to claim 4, wherein the multiplying the position number with (100−FPN)/100 when the individual program step failed, wherein the multiplying the position number with 100/(100−FPN) when the individual program step passed.

6. The machine according to claim 4, wherein the multiplying the position number with (100−FPN)/100 when the individual program step failed, wherein the multiplying the position number with (100+PPN)/100 when the individual program step passed.

7. The machine according to claim 4, wherein the multiplying the position number with (100−FPN)/100 when the individual program step failed, wherein the multiplying the position number with (100−FPN)/100 when the individual program step passed.

8. A non-transitory computer-readable storage medium with an executable software program stored thereon, wherein the program instructs a microprocessor to perform the following steps:
    (a) providing program steps of the software program;
    (b) assigning a position number to each program step;
    (c) performing an evaluation run on the program steps;
    (d) evaluating a performance of each program step;
    (e) rearranging the position number of each program step based on the performance of each program step; and
    (f) repeating steps (c)-(e).

9. The non-transitory computer-readable storage medium according to claim 8, wherein rearranging the position number of each program step comprises
    if an individual program step fails the evaluation run, increasing the position number; and
    if the individual program step does not fail the evaluation run, maintaining the same position number or decreasing the position number.

10. The non-transitory computer-readable storage medium according to claim 8, wherein rearranging the position number of each program step comprises
    if an individual program step fails the evaluation run, reducing the position number; and
    if the individual program step does not fail the evaluation, run maintaining the same position number or increasing the position number.

11. The non-transitory computer-readable storage medium according to claim 8, wherein, wherein rearranging the position number of each program step comprises
    multiplying the position number of each program step with a failing position modification number when an individual program step failed; and
    multiplying the position number of each program step with a passing position modification number when the individual program step passed.

12. The non-transitory computer-readable storage medium according to claim 11, wherein the multiplying the position number with (100−FPN)/100 when the individual program step failed, wherein the multiplying the position number with 100/(100−FPN) when the individual program step passed.

13. The non-transitory computer-readable storage medium according to claim 11, wherein the multiplying the position number with (100−FPN)/100 when the individual program step failed, wherein the multiplying the position number with (100+PPN)/100 when the individual program step passed.

14. The non-transitory computer-readable storage medium according to claim 11, wherein the multiplying the position number with (100−FPN)/100 when the individual program step failed, wherein the multiplying the position number with (100−FPN)/100 when the individual program step passed.

15. A machine for evaluating an error in a software program, the machine comprising:
    a microprocessor coupled to a memory, wherein the microprocessor is programmed to evaluate the error by
    (a) classifying the program steps of the software program;
    (b) assigning a position number to each program step;
    (c) setting a value for a fail/pass count to a starting count for each program step;
    (d) performing an evaluation run on the program steps;
    (e) evaluating a performance of each program step; and
    (f) rearranging the position number of each program step based on the performance of each program step.

16. The machine according to claim 15, further comprising setting a time limit for a maximum allowable execution time.

17. The machine according to claim 15, further comprising storing the performance of each program step after each evaluation run in the memory.

18. The machine according to claim 15, after performing the evaluation run, further comprising updating the value for the fail/pass count for each program step based on the performance of each program step.

19. The machine according to claim 18, wherein rearranging the position number of each program step comprises ranking the position number according to the updated value for the fail/pass count for each program step.

20. The machine according to claim 15, further comprising (g) repeating steps (d)-(f).

* * * * *